United States Patent [19]

Takami et al.

[11] 4,333,719
[45] Jun. 8, 1982

[54] MULTIPLE FLASH ADAPTOR

[75] Inventors: Satoshi Takami, Niiza; Teruo Hagiwara, Ageo; Toru Kando, Tokyo; Yoshifumi Kuroki, Tsurugashima, all of Japan

[73] Assignee: Asahi Kogaku Kogyo Kabushiki Kaisha, Tokyo, Japan

[21] Appl. No.: 240,422

[22] Filed: Mar. 4, 1981

[30] Foreign Application Priority Data

Mar. 10, 1980 [JP] Japan .......................... 55/30825[U]

[51] Int. Cl.³ ............................................ G03B 15/05
[52] U.S. Cl. ................................................. 354/132
[58] Field of Search ........................................ 354/132

[56] References Cited

U.S. PATENT DOCUMENTS 4,174,896 11/1979 Mizokami et al. ................. 354/132

Primary Examiner—Michael L. Gellner
Attorney, Agent, or Firm—Sughrue, Mion, Zinn, Macpeak and Seas

[57] ABSTRACT

An adaptor for a camera for operating multiple flash units with a single camera device in which all of the flash units simultaneously emit light. Output signals from each of the flash units indicating that the corresponding individual flash unit is ready to emit light are coupled to corresponding inputs of a logical product circuit such as an AND gate. The single output of the AND gate is coupled to a single corresponding input of the camera device. The X contact of the camera device is coupled in common to the actuation terminals of each of the flash units.

1 Claim, 2 Drawing Figures

MULTIPLE FLASH ADAPTOR

BACKGROUND OF THE INVENTION

The present invention relates to a multiple flash adaptor.

In order to operate a plurality of flash units with a single camera device, hereinafter referred to as "a multiple flash operation", a device called "a multiple flash adaptor" is available which is used to connect the X contact of a camera to contacts which are employed to cause a plurality of flash units to emit light. Furthermore, a system for permitting a camera to detect the electrical signals which are produced by the flash units when the latter become ready for operation has been proposed in the art recently. In the case where a plurality of flash units are operated simultaneously by a device according to this system, it is necessary to suitably process the electrical signals from the flash units.

It is difficult to satisfactorily carry out the multiple flash operation merely by connecting signal lines for transmitting the electrical signals outputted by the flash units. That is, if the time instance when the flash units become ready for operation are different, the camera detects only the electrical signal outputted by the first flash unit to become ready for operation. It cannot be detected that the other flash units are ready for operation. If the X contact of the camera is driven immediately upon receipt of the signal outputted by the first flash unit to become ready for operation, all the flash units will not be operated and the desired multiple flash operation is not achieved.

Accordingly, an object of the invention is to eliminate the above-described drawback.

SUMMARY OF THE INVENTION

In accordance with this and other objects of the invention, there is provided a multiple flash adaptor for a camera for causing a plurality of flash units to emit light in response to actuation by a single camera device. The camera device detects electrical signals produced by each of the plurality of flash units when the flash units become ready for operation. The electrical signal outputs of each of the flash units are coupled to corresponding inputs of a logical product circuit, that is, an AND gate. The AND gate, in turn, outputs a single signal to the single camera device indicating that all of the flash units are ready for operation.

DESCRIPTION OF THE PREFERRED EMBODIMENTS

A preferred embodiment of the invention will be described with reference to the accompanying drawing.

Figure 1:
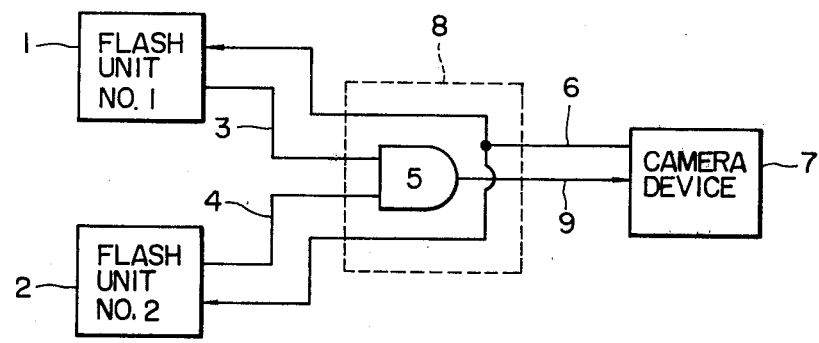
FIG. 1 is a block diagram showing a preferred embodiment of a flash adaptor unit of the invention.

FIG. 1 shows an example of a multiple flash adaptor constructed according to the invention. When flash units 1 and 2 become ready for light emitting operations, they produce electrical signals on signal lines 3 and 4 which are connected to an AND circuit 5 in the multiple flash adaptor 8. The output of the AND circuit 5 is applied through a signal line 9 to a camera device 7. X contact signal lines 6 extending from the flash units are connected together in the multiple flash adaptor 8.

Figure 2:
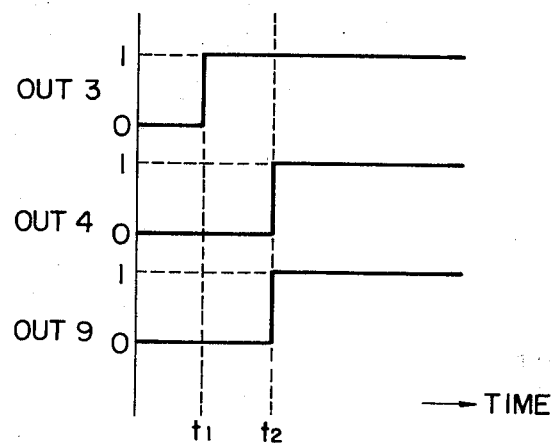
FIG. 2 is a timing chart indicating the relations among the electrical signals produced in the adaptor of FIG. 1.

FIG. 2 is a timing chart indicating the relations among electrical signals of the circuit shown in FIG. 1. More specifically, FIG. 2 indicates the time variations of the electrical signals out-3 and out-4 provided on the signal lines 3 and 4 by the flash units 1 and 2 and of the electrical signal out-9 provided on the signal line 9 by the multiple flash adaptor 8.

It is assumed that at the time instant $t_1$ the flash unit 1 becomes ready for operation and the level of the electrical signal on the signal line 3 is raised to a high logical level "1" from a low logical level "0". Furthermore, it is assumed that at the same time instant $t_1$ the flash unit 2 is not ready for operation and the electrical signal on the signal line 4 is still at "0". Under these conditions, the output of the AND circuit 5 is "0". That is, an output signal of "0" is applied to the signal line 9. In this connection, it is assumed that the camera device 7 carries out, for instance, an operation of turning on an LED in the viewfinder (not shown) of the camera when the electrical signal on the signal line 9 is at "1". Since the electrical signal on the signal line 9 is at "0" as described above, it can be detected that all the flash units are not ready for operation.

At the time instant $t_2$, both of the flash units 1 and 2 are ready for operation and therefore the electrical signals out-3 and out-4 are at "1". These signals out-3 and out-4 at "1" are applied to the AND circuit 5, and therefore the output of the AND circuit 5, i.e. the electrical signal out-9, is raised to "1". At this time, the camera device 7 carries out the abovedescribed operation as a result of which it is indicated to the photographer that all the flash units are ready for operation.

In the above-described embodiment, the number of flash units is two. If the number of flash units is increased to more than two, detection can be carried out by increasing the number of input terminals of the AND circuit to be equal to the number of flash units. That is, the camera can detect when all of the flash units are ready for operation.

As is apparent from the above description, according to the invention, it can be detected when all of the flash units are ready for operation so that all the flash units can be operated simultaneously by use of the X contact. Thus, the difficulty that some of the flash units are not operated is eliminated with the use of the invention.

What is claimed is:

1. A multiple flash adaptor for causing a plurality of flash units to simultaneously emit light in response to actuation by a single camera device, said camera device detecting electrical signals produced by said plurality of flash units when said plurality of flash units become ready for operation, comprising: a logical product circuit having inputs coupled to receive output signals from each flash unit indicative of the operatability of the flash unit and an output coupled to a single input of said camera device.

* * * * *